(12) United States Patent
Deaton et al.

(10) Patent No.: US 6,602,027 B2
(45) Date of Patent: Aug. 5, 2003

(54) GUIDES FOR CENTERING SCREWS AND DRILL BITS IN COUNTERSINK HOLES

(75) Inventors: Richard H. Deaton, New York, NY (US); Burton Weinstein, City Island, NY (US); Gordon D. Coplein, Dunwoody, GA (US)

(73) Assignee: Simp'l Products, INC, City Island, NY (US)

(*) Notice: Subject to any disclaimer, the term of this patent is extended or adjusted under 35 U.S.C. 154(b) by 0 days.

(21) Appl. No.: 09/963,818

(22) Filed: Sep. 26, 2001

(65) Prior Publication Data

US 2003/0059267 A1 Mar. 27, 2003

(51) Int. Cl.[7] ............................................... B23B 49/02
(52) U.S. Cl. ........................ 408/72 R; 16/223; 81/451; 408/201
(58) Field of Search .................... 408/72 R, 72 B, 408/241 B, 80, 201, 81; 81/451, 452; 411/39, 42, 386, 390; 16/223, 382, 383

(56) References Cited

U.S. PATENT DOCUMENTS

| | | | |
|---|---|---|---|
| 1,779,339 A | 10/1930 | Sokoloff | |
| 2,792,726 A * | 5/1957 | Vick | 408/81 |
| 3,851,990 A * | 12/1974 | West | 408/72 B |
| 4,544,307 A * | 10/1985 | Miller | 408/72 B |
| 4,862,556 A * | 9/1989 | Grass | 16/382 |
| 5,129,292 A | 7/1992 | Albert | |
| 5,490,751 A * | 2/1996 | Courgeon | 411/368 |
| 6,077,013 A | 6/2000 | Yamamoto et al. | |
| 6,250,186 B1 * | 6/2001 | O'Berry | 81/451 |
| 6,334,749 B1 * | 1/2002 | Orr | 411/386 |

FOREIGN PATENT DOCUMENTS

| | | | | |
|---|---|---|---|---|
| DE | 416576 A | * | 7/1925 | 408/241 B |
| GB | 2170744 A | * | 8/1986 | 81/451 |

* cited by examiner

Primary Examiner—Steven C. Bishop
(74) Attorney, Agent, or Firm—Gordon D. Coplein

(57) ABSTRACT

A guide to center a screw or drill bit in the center of a hole of a countersink in a member to engage a piece under the member, the countersink having a downwardly tapered wall from the member to the hole. The guide has a body with a through hole and a tapered part that is to rest on the member tapered wall to align the through hole generally perpendicular to the piece. In a preferred embodiment the guide body tapered part is at an end of the body and the body is of frangible material and holds a screw in the through hole which fractures the body as the screw is threaded into the piece beneath the member. At least one slot is formed in the body along at least a part of its length between its top and bottom ends to facilitate the fracture of the body.

18 Claims, 5 Drawing Sheets

GUIDES FOR CENTERING SCREWS AND DRILL BITS IN COUNTERSINK HOLES

FIELD OF THE INVENTION

The present invention relates to guides, or pilots, to position a screw or drill bit in the center of a countersink hole and more particularly to one of the type that is of frangible material that is broken and removed after the guiding function has been completed.

BACKGROUND OF THE INVENTION

One type of operation that is regularly performed in woodworking operations is to provide an entry point for a screw or drill bit that is centered in a hole that is countersunk in a member. A countersink hole is one that is at the termination of a wall that tapers downwardly from the member surface. The screw or drill bit is to be inserted through the hole to engage a wood piece on which the member lies and to which it is to be fastened. For example, a typical leaf type hinge has three or more countersink holes on each leaf. A wood screw is to be inserted into each countersink hole and the screw head is recessed in the countersink.

When inserting a screw into the wood piece through a countersink hole, it is necessary that the tip of the screw be precisely centered in the hole. Most often the screw tip is inserted directly into the wood piece but sometime the tip of the screw is placed in a pilot hole that has been drilled in the wood piece. In either case the screw tip or the drill bit that makes the pilot hole must be precisely centered in the hole. Otherwise, when the screw is screwed down, the screw head will not be fully recessed in the countersink. This can also cause misalignment of the hinge.

Accordingly, a need exists to provide a simple and inexpensive device to directly center the point of entry of a screw or drill bit in a countersink hole into the wood piece.

BRIEF DESCRIPTION OF THE INVENTION

In one embodiment of the invention a guide is provided to center the point of entry of a screw tip or drill bit into a wood piece through a hole of a countersink in a member. The guide has a bottom end that is tapered to generally correspond to the countersink and rests on the tapered wall of the countersink that surrounds the hole. The guide has a passage through which the screw or drill bit extends to engage the wood piece. The matching tapers of the guide and the countersink wall centers the screw tip in the hole so that it can be accurately centered to engage the wood piece.

In a preferred embodiment the guide is made of frangible plastic material and houses a screw. As the screw is threaded into the wood it fractures the guide which breaks into pieces that can be removed. In one use of this embodiment, a leaf type hinge can be sold with a set of screws each having the attached guide. This provides a convenience feature for the person attaching the hinge at very little cost.

In a modification of this embodiment, the frangible guide can be provided with one of a surrounding flange or extending lugs spaced around the guide. The flange rests on the surface of the member in which the countersink is formed and the lugs fit into corresponding grooves that are formed in the member. The guide tapered bottom end centers the guide in the countersink and the flange or lugs stabilizes the guide so that the screw will enter the wood at a perpendicular orientation. If desired, there can be an adhesive on the lower face of the flange that engages the hinge leaf.

In another embodiment of the invention, the guide is inserted in the countersink hole and held in position by a locking ring acting against the underside of the member with the countersink or by an adhesive. In a first form the guide is for a drill bit which passes into the hole in the guide to engage the wood piece to make the pilot hole. The drill bit is withdrawn and the guide is pried out of the countersink hole. In a modification of the foregoing for guiding insertion of a screw, the guide is made in two pieces and after the screw tip passes through the guide central hole into the wood piece, the two pieces of the guide are removed from the countersink hole.

OBJECTS OF THE INVENTION

An object of the invention is provide a guide to directly center the point of entry of a screw or drill bit tip in a countersink hole in a member into the wood piece under the member.

A further object is to provide a guide for centering a drill bit in a countersink hole of a member to drill a pilot hole in a wood piece under the member.

Another object is to provide a frangible guide holding a screw that centers its tip in a countersink hole.

Yet another object is to provide a guide for use with a member having a countersink hole to center the tip end of a screw or dill bit in the hole.

An additional object is to provide an insert to guide a drill bit or screw that is located in a countersink and attached to the member having the countersink by an adhesive.

BRIEF DESCRIPTION OF THE DRAWINGS

Other objects and advantages of the present invention will become more apparent upon reference to the following specification and annexed drawings in which:

FIG. 2b is a top plan view of the guide of FIG. 2a;

FIG. 3e is an elevational view partly in cross section of a modification of the guide;

FIG. 6b is an elevational view in cross-section and FIG. 6c is a perspective view showing the use of the guide insert of FIG. 6a;

DETAILED DESCRIPTION OF THE INVENTION

Figure 1:
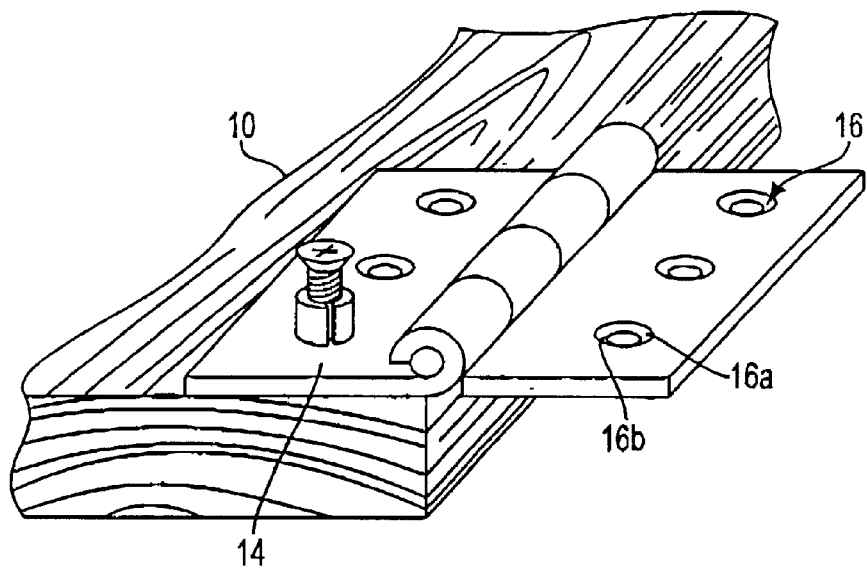
FIG. 1 is a perspective view of a hinge leaf member mounted on a piece of wood to which it is to be fastened illustrating the use of the screw guide embodiment of the invention.
Figure 2A:
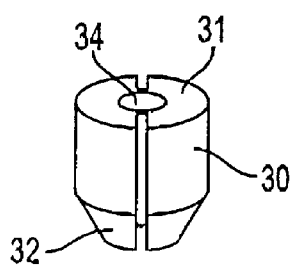
FIG. 2a is a perspective view of the screw guide of FIG. 1.
Figure 2B:
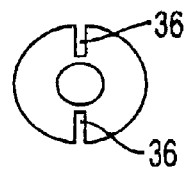
Figure 2C:
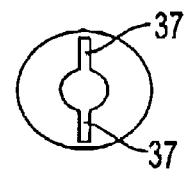
FIG. 2c is a top plan view of an alternative form of the guide.
Figure 3:
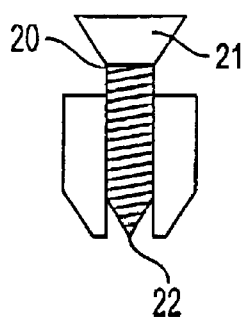
FIGS. 3 and 3a–3e are part perspective and cross-sectional views showing the use of the screw guide of FIGS. 1 and 2.

FIGS. 1–3 show a first embodiment of the invention in which there is a piece of wood 10 to which a leaf member of a conventional hinge 14 is to be fastened. The other hinge leaf would also be fastened to another wood piece 14. The hinge leaf member is typically made of metal and has a plurality of countersinks 16 with respective holes through which a screw 20 is to be inserted to fasten the hinge leave to the wood piece. Each of the countersinks 16 has a wall 16a that tapers downwardly from the hinge leaf surface to a hole 16b. The head 21 of the screw 20 to be inserted through the hole 16b has a corresponding taper so that when the screw is fully threaded into the wood piece, as shown in FIG. 3d, the screw head will be flush with or slightly below the hinge leaf top surface. While the invention is illustratively described with respect to a countersink hole in a hinge leaf, it should be understood that it is applicable to any member having a countersink with a hole through which a screw is to be passed for fastening the member to another piece.

If the pointed end 22 of screw 20 is not properly centered in the hole 16b before it is threaded into the wood, the screw head 21 will not be fully recessed into the countersink. This can also cause mis-alignment of the hinge leaf on the wood piece. Usually, the person placing the screw will try to center it in the hole 16b by eye, which is not always successful.

FIGS. 2a–2c show a preferred embodiment of a guide 30 for centering a screw 20 in the countersink hole 16b. The guide body is of generally cylindrical shape and has a flat top end 31 and a bottom end 32 that is tapered to correspond to the taper of the wall 16a of the countersink 16. A hole 34 extends through the guide body from its top to bottom ends. A screw 20 is placed in the guide member hole 34. The guide body hole 34 can be of uniform diameter, have a tapered bottom end or be treaded to accept the screw 20. In all of the embodiments the screw 20 is illustratively of the conventional wood screw type but it can be of other types, such as an auger point screw.

The body of the guide 30 is made of a suitable plastic material that will fracture upon force being applied to it. The guide has fracture aiding slots, which are portions of the guide body from which material is removed. In FIG. 2b the slots 36 extend from the outside of the guide body partially toward the hole 34 and in FIG. 2c the slots 37 extend from the hole 34 part way toward the guide body outer surface. The slots 36 and 37 are preferably diametrically opposed and also preferably extend for the full height of the center part of the guide body to the beginning of the tapered bottom end 31. While a single pair of diametrically opposed slots 36 or 37 is shown, it should be understood that there can be three, four or more of such slots.

FIG. 3 shows the screw 20 placed in the guide body hole 34 and the pointed end screw tip is at the end of the guide body. FIGS. 3–3d show the use of the guide 30. As seen in FIG. 3a, the tapered bottom end 32 of the guide 30 is placed in the countersink on the tapered wall 16a. Since both the guide bottom end 31 and countersink wall 16a match, the screw tip end 22 will be at the center of the countersink hole 16b. FIG. 3b shows the screw at the first stage of its threading into the wood piece 10 in which the tapered screw head 21 enters the guide body hole 34. As force is applied in threading the screw into the wood piece, the screw head 21 moves down on the guide body and causes it to start to fracture. Further threading of the screw, as shown in FIG. 3c, causes a completer fracture of the guide body into two parts before the screw 20 has been fully inserted into the wood piece 10 and the two split parts are temporarily held between the screw head 21 and the hinge leaf. As the screw threading is continued to completion, as shown in FIG. 3d, the fractured parts of the guide body are forced outwardly and can be easily removed from the work area. The parts of the split guide body can be manually removed. FIG. 3d also shows the screw fully fastened in the wood piece. Since the screw tip was properly centered by the guide 30 before the threading started, the screw head 21 is properly centered and fully recessed in the countersink 16.

Figure 3E:
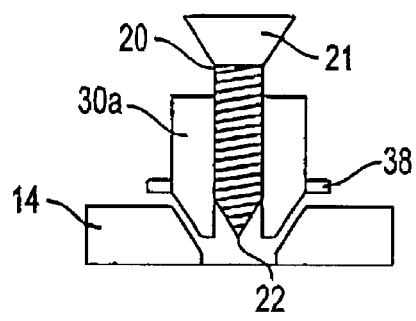
Figure 3A:
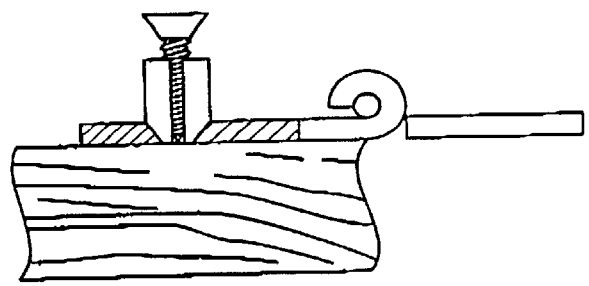
Figure 3B:
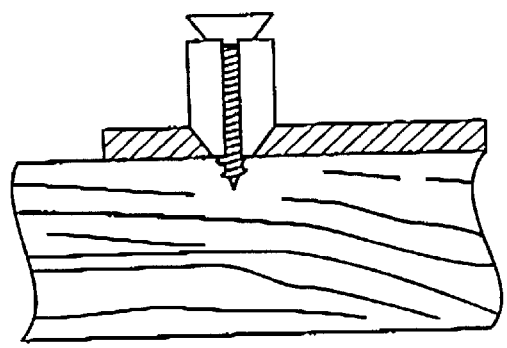
Figure 3C:
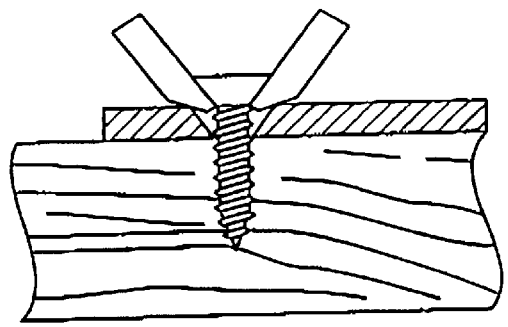
Figure 3D:
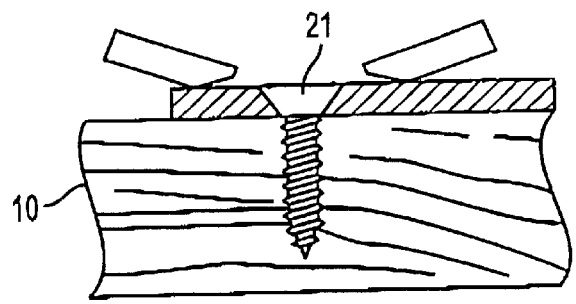

FIG. 3e shows a second embodiment of the guide. Here, the guide body 30a has a flange 38 formed around the circumference of the central cylindrical part of the guide body above the point where the taper of the bottom end 32 starts. In this embodiment, the guide body tapered bottom end 32 rests on the countersink tapered wall 16a, as described above. The flange 38 seats the guide 30a on the upper surface of member 14 and makes certain that the guide hole 34 and screw will be perpendicular to the wood piece 10. Use of the guide and its fracture is as previously described. If desired, there can be a layer of adhesive on the lower surface of the flange that lies on the hinge leaf.

Figure 4A:
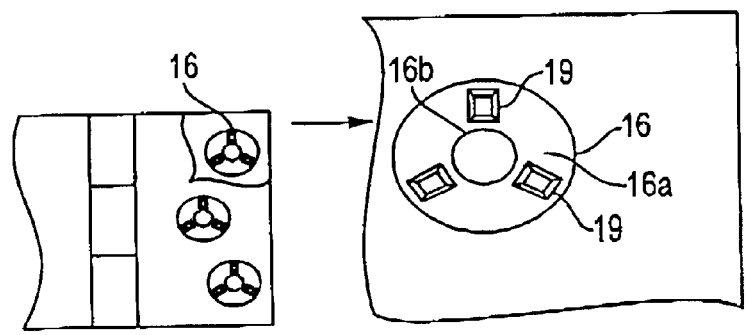
FIG. 4a is a top plan view of a hinge leaf modified to use a second embodiment of the guide and FIG. 4b is an elevational view of the guide for use with the hinge.
Figure 4B:
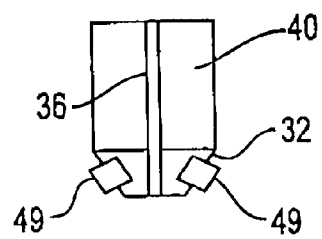

FIGS. 4 and 5 show further embodiments of the guide. In FIG. 4a the tapered wall 16a of the countersink 16 is provided with spaced recesses 19, such as by punching, staking or any other conventional process. The recesses 19 can be of any desired shape, such as circular, square or rectangular. They can be of uniform depth or of varying depth with the shallowest part toward the hole 16b. While three such recesses 19 are shown spaced apart by 120°, it should be understood that there can be fewer or more of the recesses. FIG. 4b shows a guide 40 which is substantially the same as the guide 30 previously described except for the addition of lugs 49 on the tapered bottom end 32. The lugs 49 are of a number and have a shape and spacing corresponding to the recesses 19 in the leaf countersink tapered wall 16a. In use, the tapered bottom end 32 of the guide is placed in the countersink 16 and the guide is rotated until its lugs 49 line up and fall into the corresponding recesses 19 on the countersink tapered wall 16a. This locks the guide 40 into the countersink with proper vertical alignment of the guide hole 34 so that the screw will be properly oriented perpendicular to the wood piece. The operation of the guide 40 and its fracture into pieces as the screw is threaded are as previously described with respect to FIGS. 1–3.

Figure 5A:
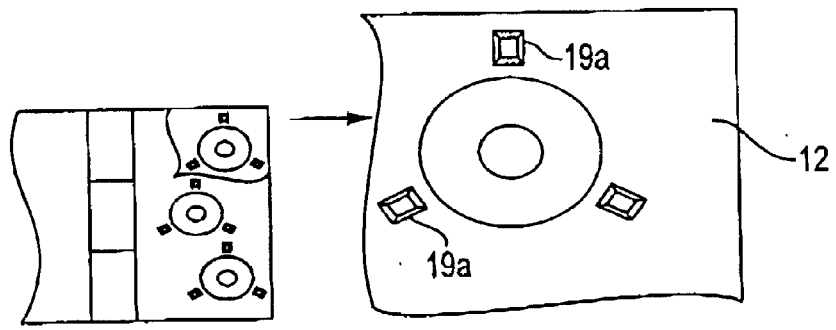
FIG. 5a is a top plan view of a hinge leaf modified to use a third embodiment of the guide and FIG. 5b is an elevational view of the guide for use with the hinge leaf.
Figure 5B:
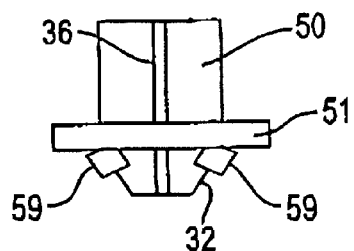

FIGS. 5a and 5b show a further embodiment which is a modification of that of FIGS. 4a–4b. Here, recesses 19a are on the leaf member spaced away from the countersink 16 instead of on the countersink tapered wall 16a. The guide body is provided with a surrounding flange 51 on the cylindrical part of the body above the bottom taper 32. Extending downwardly from the flange 51 are lugs 59 of a number, placement and shape to lock into the recesses 19a. The operation of this embodiment is similar to that of FIG. 4, in that the guide body rotated until its lugs 59 fit into the recesses 19a in the member 12.

Figure 6A:
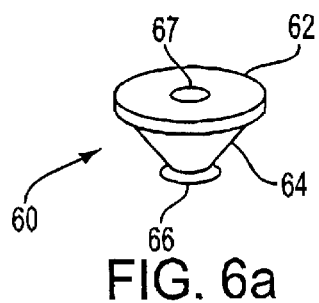
FIG. 6a is a perspective view of a drill guide insert to be inserted in a countersink hole.
Figure 6B:
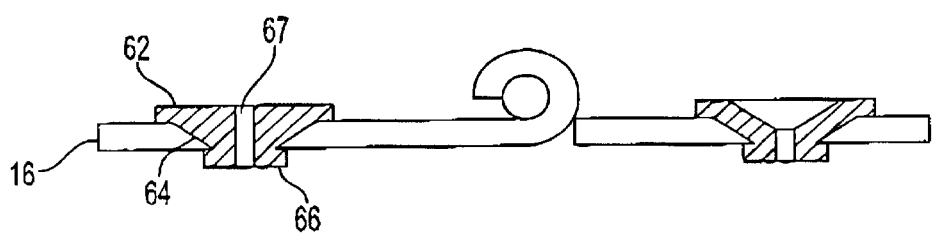
Figure 6C:
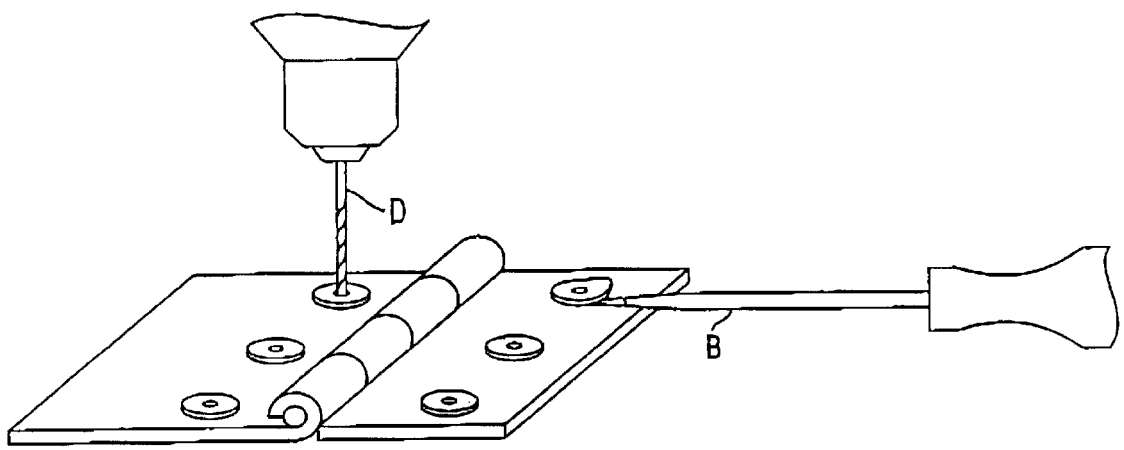

In some cases, such as where the wood piece is of hard wood, such as oak, or for other reasons a pilot hole has to be drilled in the wood piece 10 centered in the hole 16b of a countersink 16. FIGS. 6a–6c show an embodiment of the invention that can be used for this purpose. Here there is an insert guide 60 that is preferably made of a relatively soft plastic resin. The body of guide 60 is of one integral piece and has a flange top 62 that is to lie on the top surface of the member 12 with the countersink 16, a tapered central portion 64 that matches the tapered wall 16a of the countersink and a locking ring 66. A central hole 67 extends through the guide body 60. The diameter of the hole 67 is made somewhat larger than the diameter of a drill bit D that is to pass through it.

The taper of the central body portion 64 corresponds to the taper of the countersink wall 16a and the thickness of the central body portion is substantially the same as that of the hinge leaf 16. The top flange 62 can be made relatively thick to provide stability and a good aligning surface for the drill bit. The locking ring 66 thickness can be made as thick as desired but should be thin enough so that the guide can be easily removed from the countersink 16 in member 12.

As shown in FIG. 6b, the guide body is placed into one of the hole 16b in the countersink. It is preferred that the material for the body be soft so that ring 66 can deform as it is pushed through the hole 16b. The ring 66 then returns to its original shape to lock the guide 60 into the countersink 16. Once the guide 60 is locked in the countersink, it provides a centered guide hole 67 for the drill bit D to make pilot hole in the wood piece, as shown in FIG. 6c. After the pilot hole is drilled the drill bit is removed from the guide hole 67 and the guide 60 is pried out of the countersink hole 16b by the flat blade end B of a screwdriver or similar device. When the screwdriver is removing a guide 60 from a hole 16b, the locking ring is either snapped off as it is pried upwardly through the hole or it deforms.

Figure 7:
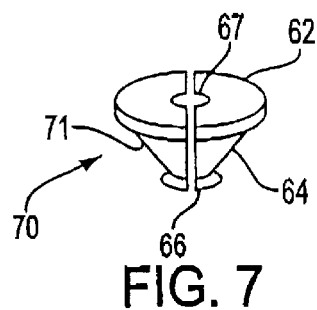
FIG. 7 is a perspective view of a further embodiment of the guide.

FIG. 7 shows a modification of the guide insert of FIG. 6 to be used to center a screw to be directly threaded into the wood piece, as in the embodiments of FIGS. 1–4. Here, the guide insert 70 is made in two separate pieces 71 which are placed in a countersink hole 16b which centers the insert hole 67 in the countersink hole. The screw 20 is placed into the guide hole 67 and the threading of the screw is started. Once the tip end of the screw is engaged in the wood piece the two halves of the guide insert 70 are removed from the hole, such as by a screwdriver blade tip or a pair of needle-nose pliers. The tip end of the screw will be properly centered because of the matching contours of the tapers of the countersink wall 16a and the tapered center body part 64 of the guide insert.

Figure 8A:
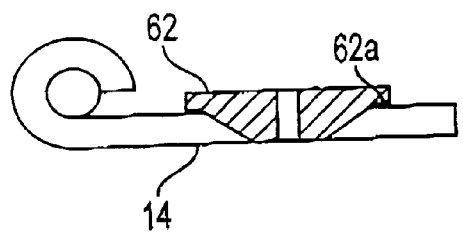
FIG. 8 is a view of a modification of the embodiments of inserts shown in FIGS. 6 and 7.
Figure 8B:
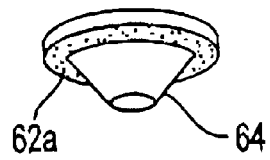

FIG. 8 is a modification of the inserts of FIGS. 6 and 7 in which the locking ring 66 has been eliminated. Here, a layer 62a of an adhesive is placed on the lower surface of the top flange 62. The adhesive holds the guide insert 60 in place in the countersink 16. Once the hole is drilled, the insert is removed from the leaf 16 by prying up on the flange 62 to break the adhesive bond. This embodiment is both simpler to make and use than that of FIGS. 6 and 7 since the locking ring 66 is eliminated and it is not necessary to have to push the locking ring through the hole of the countersink to lock the insert in the countersink.

Figure 9A:
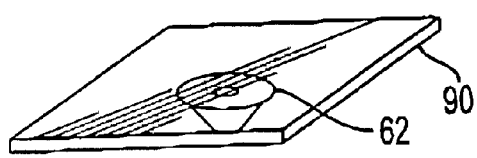
FIGS. 9a and 9b are respectively a perspective and a cross-sectional view of an insert to be attached by an adhesive strip to the member having the countersink.
Figure 9B:
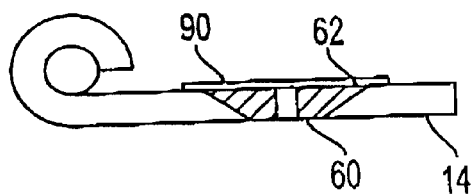

In the embodiment of FIGS. 9a–9b, there is a piece of adhesive tape over the top flange 62 of the insert body 60, which can be of one piece. Here, the insert is placed in the countersink and the adhesive strip 90 is fastened to the leaf 14. After the pilot hole is made, the user lifts the adhesive strip 90 from the leaf to remove the insert from the countersink. The tape 90 can be transparent or opaque. In the latter case, a target can be printed to center the pilot hole.

Figure 10A:
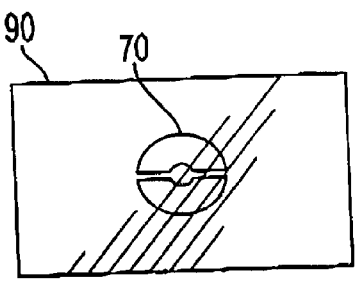
FIGS. 10a and 10b are respectively a top plan and elevational views of a modification of the embodiment of FIGS. 9a–9b.
Figure 10B:
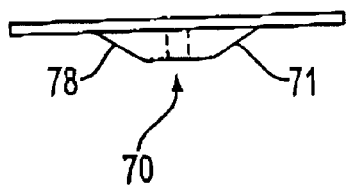

In the embodiment of FIGS. 10a–10b the insert body is made of two pieces as in FIG. 7 and there is the piece of adhesive tape 90 on the top of the flanges of the pieces. As in the case of FIGS. 9a–9b, the insert body 70 is positioned in the countersink 16 and the insert is used for the pilot hole or starting the insertion of the screw as described above. Here, the two pieces 71 of the insert can be removed with the drill or screw in place in the hole in the insert body.

In the embodiments of FIGS. 9 and 10 there can be a large rectangular piece of tape or a long strip of tape that is sectioned with a guide insert mounted to each section. The sections are torn from the larger adhesive piece or elongated strip and used as described above.

The embodiment of FIGS. 1–5 also can be used as drill guides. That is, the central hole 37 is made of a suitable diameter to accept a drill bit to be used to drill a pilot hole. The tapered guide bottom end 32 alone or in combination with the flange 38 of FIG. 3b or lugs and recesses of FIGS. 4 and 5. In this case, the body of the guide does not have to be of frangible material. Also, in all these embodiments the body 30 of the insert can be made with any desired height.

Each of the guides described herein can be made by any suitable process, such as injection molding. Thus, they are relatively inexpensive. The screw guides that fracture are disposable items and can be molded with the screws in place or the screws inserted after the molding. The insert and guides used for drill guides can be re-used.

Specific features of the invention are shown in one or more of the drawings for convenience only, as each feature may be combined with other features in accordance with the invention. Alternative embodiments will be recognized by those skilled in the art and are intended to be included within the scope of the claims.

We claim:

1. A guide for use with a screw having a head with a tapered lower surface to center the screw in a hole of a countersink in a member to engage a piece under the member, the countersink in the member having a downwardly tapered wall from the top surface of the member to the hole, said guide having a body of frangible material with a through hole from its top to bottom ends and a tapered part at a lower part that is to rest directly on the member countersink tapered wall to align the guide with said body through hole being generally perpendicular to the piece, wherein the screw tapered lower surface moving into the top of said body through hole engages and fractures the body as the screw is threaded into the piece under the member.

2. A guide as in claim 1 wherein at least one slot is formed in said body along at least a part of its length between its top and bottom ends to facilitate the fracture of said body as engaged by the tapered lower surface of the screw.

3. A guide as in claim 2 wherein said at least one slot extends from the exterior of said body toward said through hole.

4. A guide as in claim 2 wherein said at least one slot extends from said through hole toward the exterior of said body.

5. A guide as in claim 2 wherein there are a pair of said slots that are diametrically opposed.

6. A guide as in claim 5 wherein each said slot of said pair of slots extends from the exterior of said body toward said through hole.

7. A guide as in claim 5 wherein each said slot of said pair of slots extends from said through hole toward the exterior of said body.

8. A guide as in claim 1 wherein said body further comprises a flange extending from the exterior of said body to rest on the surface of the member surrounding the countersink.

9. A guide as in claim 8 further comprising an adhesive on a surface of said flange that rests on the surface of the member surrounding the countersink.

10. A guide as in claim 9 wherein said adhesive is on the lower surface of the flange that contacts the surface of the member surrounding the countersink.

11. A guide as in claim 1 wherein said body is of overall generally cylindrical shape and is to be free standing when place in the countersink.

12. A guide as in claim 1 wherein said member has at least one recess formed on at least one of the downwardly tapered wall of said countersink and the member surface adjacent said countersink, and said body further comprises at least one lug to fit into a corresponding said at least one recess as said tapered end of said body engages said tapered wall of said countersink.

13. A guide to center a screw or drill bit in the center of a hole of a countersink in a member to engage a piece under the member, the countersink in the member having a downwardly tapered wall from the top surface of the member to the hole, said guide having a body with a through hole from its top to bottom ends and a tapered part at a lower part that is to rest directly on the member countersink tapered wall to align the guide with said body through hole being generally perpendicular to the piece, wherein said body further comprises a flange extending from the exterior of said body to rest on the surface of the member surrounding the countersink and a locking ring at the bottom end that is passed through the countersink hole to engage the bottom surface of the member to lock the guide to the member.

14. A guide as in claim 13 wherein at least said locking ring is of a plastic material that can be compressed to pass through the countersink hole.

15. A guide as in claim 13 wherein said through hole is of uniform diameter to accept a drill bit.

16. A guide as in claim 13 wherein said body is of an integral one piece structure.

17. A guide as in claim 13 wherein said body is of two pieces split along the body length from the top to bottom ends.

18. The combination of:

a member having a countersink hole, the countersink having a downwardly tapered wall from the member to the hole, said member having at least one recess formed on at least one of the downwardly tapered wall of said countersink and the member surface adjacent said countersink; and a guide to center a screw or drill bit in the center of said hole in said member to engage a piece under said member, said guide having a body with a through hole and a tapered part on the lower end of said body that is to rest on said countersink tapered wall to align said guide body through hole generally perpendicular to the piece and said body further comprises at least one lug to fit into a corresponding said at least one recess as said tapered end of said body engages said tapered wall of said countersink.

* * * * *